United States Patent
Eriksson et al.

(10) Patent No.: US 8,996,019 B2
(45) Date of Patent: Mar. 31, 2015

(54) METHOD AND ARRANGEMENT FOR RESOURCE MANAGEMENT

(75) Inventors: Ann-Christine Eriksson, Grillby (SE); Håkan Olofsson, Stockholm (SE); Fredrik Persson, Märsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 298 days.

(21) Appl. No.: 13/501,347

(22) PCT Filed: Oct. 15, 2009

(86) PCT No.: PCT/SE2009/051177
§ 371 (c)(1),
(2), (4) Date: Apr. 11, 2012

(87) PCT Pub. No.: WO2011/046477
PCT Pub. Date: Apr. 21, 2011

(65) Prior Publication Data
US 2012/0202549 A1 Aug. 9, 2012

(51) Int. Cl.
*H04W 72/00* (2009.01)
*H04W 28/16* (2009.01)
(Continued)

(52) U.S. Cl.
CPC .............. *H04W 28/16* (2013.01); *H04W 28/18* (2013.01); *H04W 72/0433* (2013.01);
(Continued)

(58) Field of Classification Search
USPC ................................ 455/450–455, 552.1, 509
See application file for complete search history.

(56) References Cited

U.S. PATENT DOCUMENTS

2008/0031273 A1   2/2008  Wang
2008/0240021 A1*  10/2008 Guo et al. ............... 370/328
(Continued)

FOREIGN PATENT DOCUMENTS

EP    1503606 A1    2/2005
WO   02/104054 A1   12/2002

OTHER PUBLICATIONS

3rd Generation Partnership Project. 3GPP TR 25.881, V5.0.0 (Dec. 2001). 3rd Generation Partnership Project; Technical Specification Group Radio Access Network; Improvement of RRM across RNS and RSN/BSS (Release 5). Dec. 2001.

*Primary Examiner* — Fayyaz Alam
(74) *Attorney, Agent, or Firm* — Murphy, Bilak & Homiller, PLLC

(57) ABSTRACT

The invention relates to a method in a communication node (10,200,201,202,211,212,222) for commonly managing resources in a radio access network between different network access technologies, which communication node (10, 200,201,202,211,212,222) is comprised in a radio access network of a radio communications network. The communication node receives (71) from a first local resource manager (111) of a first network access technology, a first report of information regarding resources needed per service associated with the first network access technology, which service is associated with a first local service priority. The communication node (10,200,201,202,211,212,222) then receives (72) from a second local resource manager (112) of a second network access technology, a second report of information regarding resources needed per service associated with the second network access technology. The service is associated with a second local service priority. The communication node ranks the service priority in the first report in relation to the service priority in the second report. The communication node generates an allocation scheme of resources, which allocation scheme allocates resources to at least one of the first or second local resource managers (111, 112) based on the ranking of the service priorities.

14 Claims, 8 Drawing Sheets

(51) Int. Cl.
  *H04W 28/18* (2009.01)
  *H04W 72/04* (2009.01)
  *H04W 72/10* (2009.01)
  *H04W 72/12* (2009.01)
  *H04W 88/10* (2009.01)

(52) U.S. Cl.
  CPC ...... *H04W 72/0453* (2013.01); *H04W 72/0473* (2013.01); *H04W 72/10* (2013.01); *H04W 72/1215* (2013.01); *H04W 72/1242* (2013.01); *H04W 88/10* (2013.01)

USPC ........ 455/450; 455/451; 455/452.1; 455/453; 455/454; 455/455

(56) References Cited

U.S. PATENT DOCUMENTS

| 2009/0225689 | A1 | 9/2009 | Yu | |
| 2010/0255849 | A1* | 10/2010 | Ore | 455/450 |
| 2010/0291941 | A1* | 11/2010 | Chen et al. | 455/450 |

* cited by examiner

METHOD AND ARRANGEMENT FOR RESOURCE MANAGEMENT

TECHNICAL FIELD

The invention relates to a method and an arrangement in a communication node. In particular, the invention relates to commonly manage resources in a radio access network between different network access technologies.

BACKGROUND

Today's development of multi-standard radio access network equipment for, for example, Global System for Mobile communications (GSM), Wideband Code Division Multiple Access (WCDMA) and Long Term Evolution (LTE) is in full progress. The first products practically only allow for network nodes to be co-located in the same cabinets. However, the development advances towards a common hardware (HW) and software (SW) for these nodes in the cabinet, and from a rather static resource allocation per access towards a more dynamic resource allocation of, for example, transmit power and transport network capacity.

Resource management is currently used within each radio access network to distribute and utilize available resources as efficiently as possible. The different characteristics of each resource are considered, as well as the different kinds of services utilizing the resources. A variety of services like best-effort data and real-time voice are catered for, all with different requirements. Application layer signaling and radio access network internal control signaling create additional data flows that need to be handled. Each flow is prioritized and resources allocated according to the specific requirements. At present, for three radio access technologies, GSM, WCDMA and LTE, resource management functionality is distributed in different nodes.

A simple state-of-the-art way of dividing the resources between the accesses may be to assign a fixed share to each access, a so called fixed allocation of resource sharing. There should not be any overlap in resource capacity to avoid over-utilization, but it is well-known which partition of each resource the access can utilize which simplifies design basically, the accesses operate completely in parallel, within the scope of a multi-standard equipment. The resource share may be configured based on, for example, estimated traffic mix and load, or just according to the operators' migration plans for different accesses. However, there are drawbacks in potential under-utilization of resources, and a lack of possibility to utilize the common hardware and network capacity to increase efficiency and service quality. The last aspect goes back to the difficulty to estimate the traffic demands, due to traffic variations, the relative importance of different services in different accesses, the resource requirements to fulfill the requested bit rate, delay, packet loss, etc, and the inability to adapt to changes, for example, due to shifts in access utilization at different peak hours.

A more flexible way of dividing the resources between the accesses is to have one part of the resources fixed allocated to one/some of the accesses, a so called Semi-dynamic allocation of resource sharing. Alternatively, giving one of the accesses highest priority when dynamically allocating the resources. The remaining part of the resources is then dynamically allocated between the accesses reflecting the instantaneous traffic or load situation. One example of semi-dynamic resource sharing would be to give GSM the highest priority when allocating resources, and WCDMA and LTE are sharing the left-over resources. This method has been discussed in conjunction with early multi-standard base stations.

The most flexible way of dividing resources between the accesses is to allocate resources completely dynamically, so called dynamic allocation of resource sharing. Still the allocation could be based on the same criteria as when configuring fixed resource shares, but with the difference that the resource shares can be adapted to reflect the instantaneous traffic or load situation. This gives the best possibilities to increase the resource utilization, and also to follow changes in the traffic mix or density. However, prior art solution may not provide a resource allocation by which it will be able to ensure the appropriate service quality.

SUMMARY

An object of embodiments herein is to provide a mechanism that handle resource distribution in a flexible and efficient manner.

The object is achieved by providing a method in a communication node. The method is for commonly managing resources in a radio access network between different network access technologies. The communication node is comprised in a radio access network of a radio communications network. The communication node receives from a first local resource manager of a first network access technology, a first report of information regarding resources needed per a first service. The first service is associated with a first local service priority of the first network access technology.

The communication node also receives from a second local resource manager of a second network access technology, a second report of information regarding resources needed per a second service. The second service is associated with a second local service priority of the second network access technology.

The communication node ranks the first local service priority in relation to the second local service priority. The communication node generates an allocation scheme of resources, which allocation scheme allocates resources to at least one of the first or second local resource managers based on the ranking of the service priorities.

In order to perform the method an arrangement in the communication node is provided. The arrangement comprises a receiving unit arranged to receive from the first local resource manager of the first network access technology, the first report of information regarding resources needed per the first service. The first service is associated with a first local service priority of the first network access technology. The receiving unit is further arranged to receive, from the second local resource manager of the second network access technology, the second report of information regarding resources needed per the second service. The second service is associated with a second local service priority of the second network access technology.

The arrangement further comprises a ranking unit arranged to rank the first local service priority in relation to the second local service priority. In addition, the arrangement comprises a generating unit arranged to generate an allocation scheme of resources, which allocation scheme allocates resources to at least one of the first or second local resource managers based on the ranking of the service priorities.

For example, when using a multi-standard radio access network, some common resources will be shared between the radio accesses and there is a desire for common resource management, allocating resources to the different radio accesses. It should be understood that the mechanism of providing common resource management may be implemented in a separate communication node or in an existent communications node, such as a radio base station or a radio base station controller.

Examples of resources may comprise: transmit power, digital processing capacity, transport network capacity, memory, spectrum usage or the like.

BRIEF DESCRIPTION OF THE DRAWINGS

Embodiments will now be described in more detail in relation to the enclosed drawings, in which.

DETAILED DESCRIPTION

Figure 1:
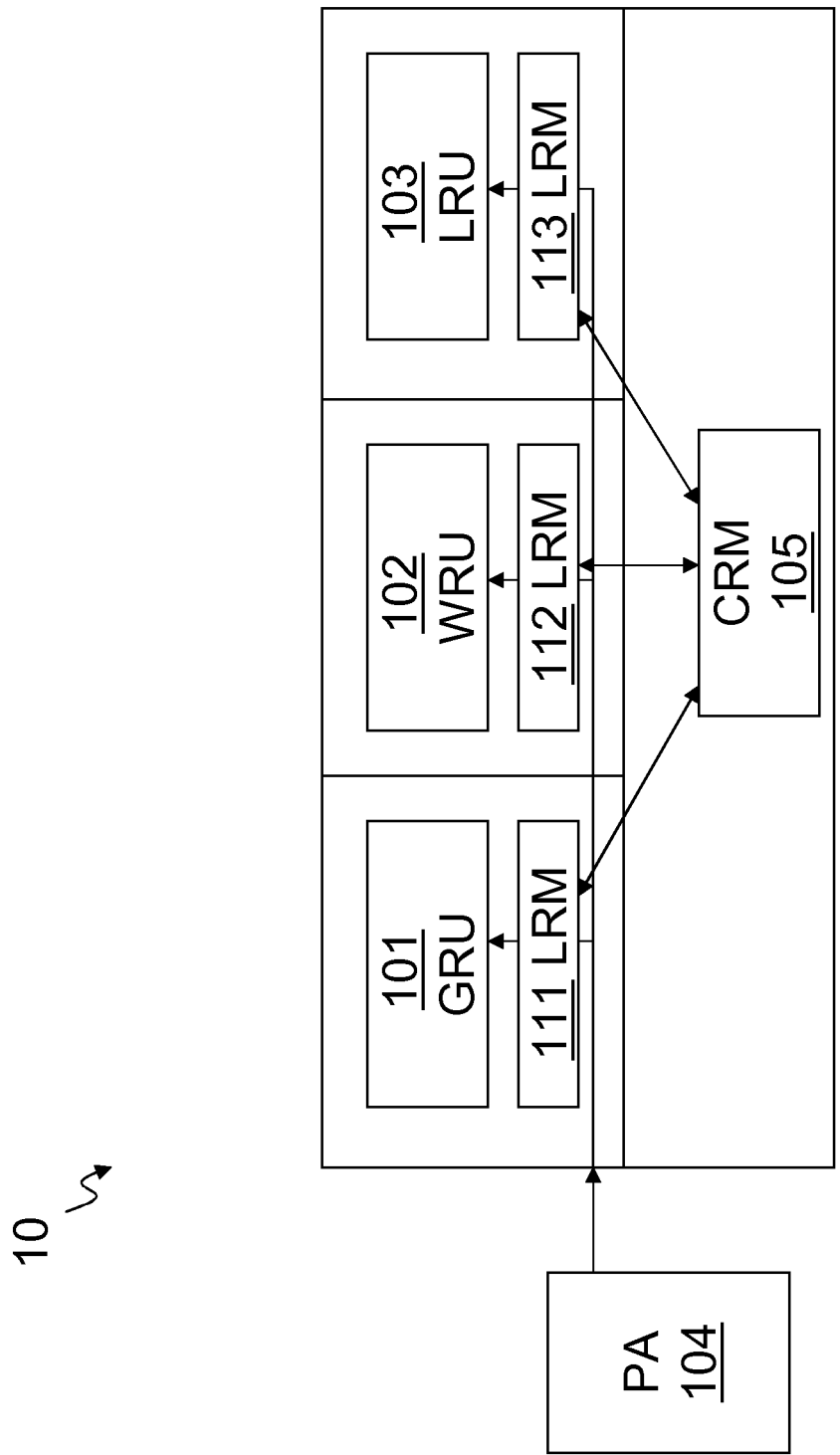
FIG. 1 is a schematic diagram of a multi standard radio base station.

FIG. 1 shows a schematic diagram of a communication node 10. In the illustrated example the communication node 10 is represented by a multi standard radio base station. It should however be understood that the communication node 10 may be represented by a radio base station controller or a unique separate network node.

The multi standard radio base station 10 comprises a GSM radio unit 101 (GRU), a WCDMA radio unit 102 (WRU), and a LTE radio unit 103 (LRU). Each radio unit may serve a cell comprising a number of user terminals, with the generic name User Equipment (UE).

One role of the multi standard radio base station 10 is that all or some traffic to and from the user equipment in the cells are routed via the GRU, WRU, LRU 101-103.

To be able to ensure quality of service fulfillment for all services in all accesses, resource management in a multi-standard network must base its resource allocation on the instantaneous need for resources. As mentioned above, examples of resources include: transmit power, digital processing capacity, transport network capacity, memory, spectrum usage or the like. In the illustrated example, the common resource is the transmission power of a power amplifier 104 (PA) used to power the transmissions of the different radio units 101-103.

In the illustrated example, the multi standard radio base station 10 comprises a common resource management function 105 (CRM). The CRM 105 dynamically considers the actual service across all radio access technologies and respective service priorities, such as indication of quality of service (QoS) requirements or service bearer priorities, when distributing common resources across the radio access technologies. In the illustrated example, the actual services and quality of service requirement of each radio access technology (RAT) is reported from local resource managers (LRM) within each RAT unit. Thus, a first LRM 111 of the GSM radio unit reports to the CRM 105 resources needed per quality of service profile associated with GSM, a second LRM 112 of the WCDMA radio unit reports to the CRM 105 resources needed per quality of service profile associated with WCDMA, and a third LRM 113 of the LTE radio unit reports to the CRM 105 resources needed per quality of service profile associated with LTE.

The CRM 105 then ranks the different quality of service profiles of the different RATs and generates an allocation scheme of the resource, that is, in the illustrated example the transmission power of the PA 104. The allocation scheme is generated based on the ranking of the quality of service profiles. The allocation scheme may then be transmitted to the different radio units GRU, WRU, LRU 101-103 indicating the resource allocation. The radio units GRU, WRU, LRU 101-103 may then use the allocation scheme to schedule transmissions or the like.

Thus, the CRM 105 handles the resource distribution in an efficient and flexible manner. The principle of allocating resources per service may be explained as available resources are allocated in order of the configured service priority until end of resources. A scheduler in each radio unit may then allocate effect of the PA 104 on every bearer or a number of bearers are allocated an effect per time transmission interval.

It should here be noted that the different network access technologies may comprise a wired access technology as well as wireless access technologies.

Figure 2:
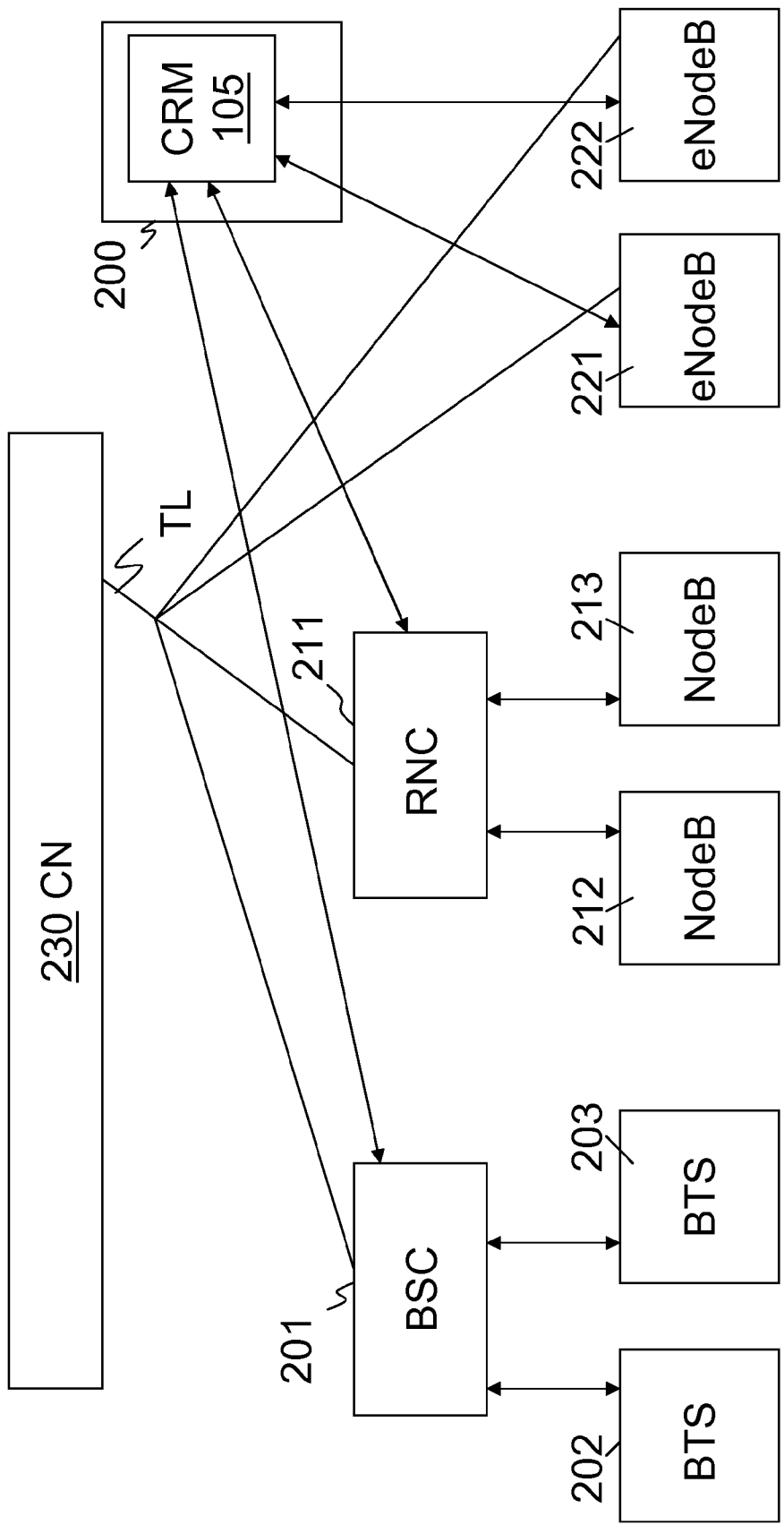
FIG. 2 is a schematic diagram of a multi standard radio communications network.

FIG. 2 shows a simplified RAN architecture of today. Resource management entities are located in different nodes of the three radio accesses. A functionality is implemented into the network wherein the function of the common resource management is provided. In the illustrated example the CRM 105 is implemented in a separate communication node, a CRM node 200. However, the CRM 105 may also be implemented in the radio base station such as the BTS, NodeB, eNodeB, and/or the radio base station controller, such as the BSC, RNC.

The CRM node 200 is connected to a base station controller (BSC) 201 of a GSM network. The BSC 201 serves a couple of radio base transceiver stations (BTS), a first BTS 202 and a second BTS 203. The CRM node 200 is further connected to a radio network controller (RNC) 211 of a WCDMA network. The RNC 211 serves a first NodeB 212 and a second NodeB 213. In addition, the CRM node 200 is also connected to a first eNodeB 221 and a second eNodeB 222 of a LTE network.

In the illustrated example the GSM, WCDMA, LTE Network Access Technologies uses transport resources of a transport line (TL) to a core network (CN) 230. The BSC 201 registers the amount of resources per service needed in the uplink of the transport line from the BTSs 202,203. The RNC 211 registers the amount of resources per service needed in the uplink of the transport line from the NodeBs 212,213. The first eNodeB 221 and the second eNodeB 222 registers the amount of resources needed per service in the uplink of the TL. Each service is associated with a local service priority of respective network access technology.

The BSC 201 reports the resources needed per service in the uplink of the TL to the CRM node 200. The RNC 211 reports the resources needed per service in the uplink of the TL to the CRM node 200. The eNodeBs 221,222 report the resources needed per service in the uplink of the TL to the CRM node 200.

The CRM 105 of the CRM node 200 then ranks the different services based on the local service priorities in relation to one another based on a configured and/or standardized "global" priority scheme. The local service priority is then a reference to the global priority in the configured priority. The CRM 105 then, based on the ranking, generates an allocation scheduling scheme of transport resources of the uplink of TL.

The allocation scheduling scheme is then transmitted to the BSC 201, RNC 211, the first eNodeB 221 and the second eNodeB 222. Schedulers in the different nodes may then schedule the uplink traffic according to the allocation scheduling scheme. This scheduling will result in an optimal, efficient way of distributing the transport resources of the TL.

In the illustrated example direction of the resources needed has also been accounted for. However, the direction parameter is optional.

Figure 3:
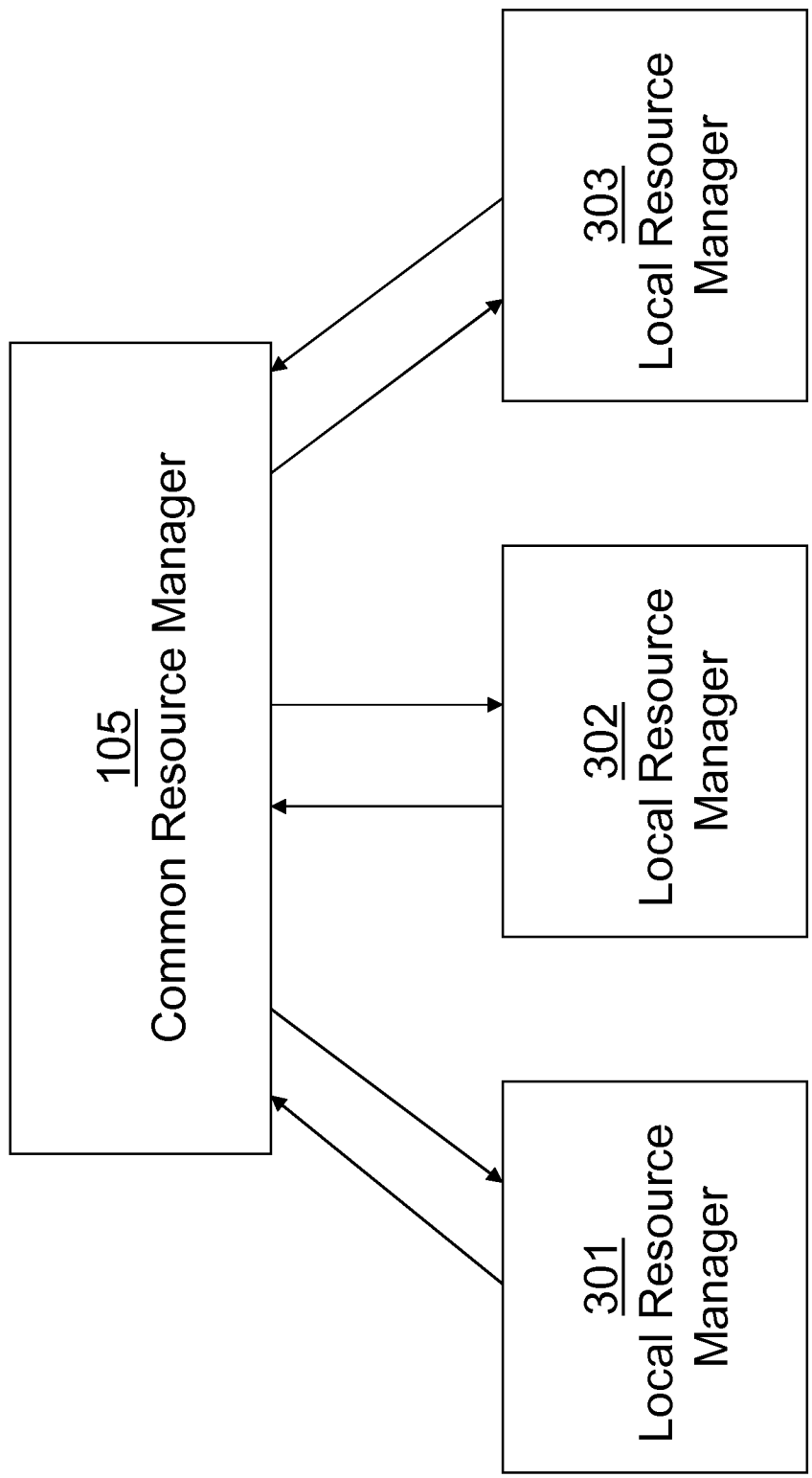
FIG. 3 is a schematic diagram of managing resources system.

FIG. 3 is a schematic block diagram of a resource management system. The common resource management function 105 dynamically considers the actual services across all radio access technologies and respective service priority, such as quality of service (QoS) requirements or service bearer priority, when distributing common resources across the radio access technologies. This may, for example, be achieved with the common resource management function 105 on top of the local per-access resource management, which common resource management function 105 considers the service priority of the actual services/bearers in the radio access network and distributes the common resources between the radio access technologies according to current resource need in every resource scheduling instance. The common resource management function 105 should be located close to the local resource management and may be split into different entities depending on type of resource and its location.

In the illustrated embodiment, the CRM 105 is communicating with a first LRM 301, a second LRM 302, and a third LRM 303. The LRMs 301-303 reports needed resources per service to the CRM 105 and the CRM 105 transmits the allocation scheme of resources to the LRMs 301-303.

Thus, the LRMs 301-303 report the current need of resources and local priority of the current services/bearers. Using these inputs the common resource management function 105 generates an allocation scheme for distributing a share of the common resource to each network access technology. The allocation scheme may be sent to each LRM 301-303.

The frequency of this reporting and resource distribution will typically vary with the resource type, from every scheduling instance to much longer time periods. Transmit power may require fast resource management, while spectrum usage will typically be distributed at a much slower pace.

It is then up to the LRMs 301-303 to allocate each LRM own distributed share of the common resource between its services/bearers using its local principles. The local resource manager functionality may decide the exact amount of resources to allocate to each logical channel in each time instant.

Figure 4:
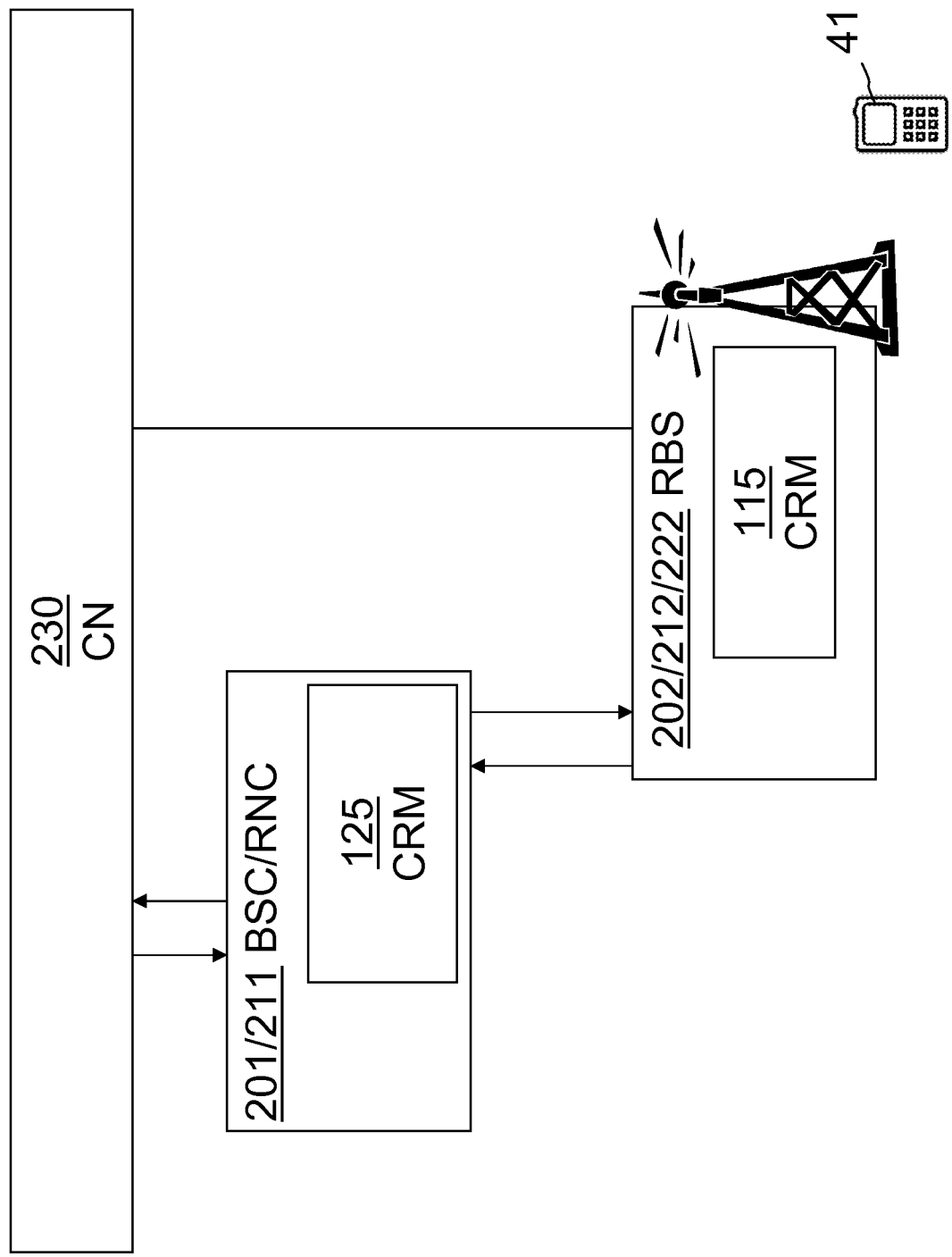
FIG. 4 is a schematic diagram of a radio communications system.

Per-access resource management functions may be located in different nodes today. This puts requirements on the location of the common resource management function 105. Either the present control over resources and functionality may be moved to fit a new central multi-standard resource management, or the new multi-standard resource management may be split to fit the present division. The common resource management function 105 may also be placed in different locations depending on the resource to manage. For example, as shown in FIG. 4, one resource may be managed by a first CRM 115 in the radio base station (RBS) 202/212 serving a first UE 41. Another resource may be managed in the radio network control node (BSC/RNC) 201/211 by a second CRM 125. In this case additions to existing interfaces may possibly be required, depending on the functional split of each network access technology. Interaction between common resource management and local resource functionality like admission and congestion control, as well as involved interfaces, are affected by the location as different information, resources, channels is handled by different communication nodes, and by putting these together in a common functionality certain dependencies will affect the above. The RBS 202/212 and the BSC/RNC 201/211 is connected to the CN 200.

Note that there may be several instances of multi-standard resource managers, one per resource type, or a combined multi-standard resource manager handling several resource types.

The resource management needs knowledge about every access' need for resources, provided at an adequate period. The LRMs 301-305 report the total resource need per carrier, service and/or channel to the central resource manager function 105/115/125. Both the input itself and the source of input, as well as the reporting frequency required, will differ depending on the resource type in focus.

In addition the resource need per service should be reported, wherein each service is associated with a local service priority. The local service priority may be defined as quality of service (QoS) profile, giving the relation between resource needs and QoS requirements. QoS profile means for example, Conversational, Streaming, Interactive, Background for GSM and WCDMA; and a QCI number for LTE. The resource need per quality of service (QoS) profile may be provided by the average need measured over a certain period of time, or instantaneous resource need through the buffer status per logical channel together with an indication on the corresponding quality of service class; different options, see below. This gives the possibility to allocate resources per quality of service profile. The local service priority may also be indicated by service bearer priority and then this service bearer priority needs to be reported.

The reporting frequency may differ dependent on resource type. Since the traffic distribution may not change as fast as the total resource need, a slower reporting frequency than for the total resource need may be used. For example, the amount of speech in relation to the amount of data traffic in a cell may not change as rapidly as the total amount of total needed resources in the cell. Hence, the type of traffic, that is, the service, may be reported more seldom than the total amount of resources needed.

A main principle of embodiments herein is to compare and rank the service needs of different flows within different network access technologies, when distributing common resources. The ranking is based on the local priorities of the services. But, within the three exemplary radio access technologies, the service priorities are determined with different parameters. Therefore, there is need for ranking between the different service priorities to make them comparable. Several options are possible, in the examples the service priority is represented as quality of service profile:

Through the per-bearer Quality of Service profiles provided from the core network to the network access network over the S1, Iu, or A/Gb interfaces, for LTE, WCDMA and GSM, respectively. In this way quality of service profile as expressed using the 3GPP definitions is provided directly to the common resource manager function 105. To get a possible comparison between the QoS paradigms, an operator-configured or standardized prioritization list between the different intra-access Quality of Service profiles is needed. In the special case of operator-defined Quality of service Class Indicators (QCI) a configuration by the operator is always needed anyhow. This is also the case for the scheduling priority indicators (SPIs), which are not standardized but operator configured.

Between High Speed Packet Access (HSPA) and LTE, ranking the quality of service profiles may be done through the scheduling priority indicators and related parameters in WCDMA, and comparing those with the QCI and related parameters in LTE.

Through a global priority configured within each access according to standardization and/or configuration. In this way no further translation needs to be done in the common resource manager function 105.

The two first options require that the quality of service requirements are known and provided as input to the common resource management function and there translated into a common priority order. In the third option this translation is done within each access. Other ways of ranking the service priorities of the different network access technologies may also be used.

Figure 5:
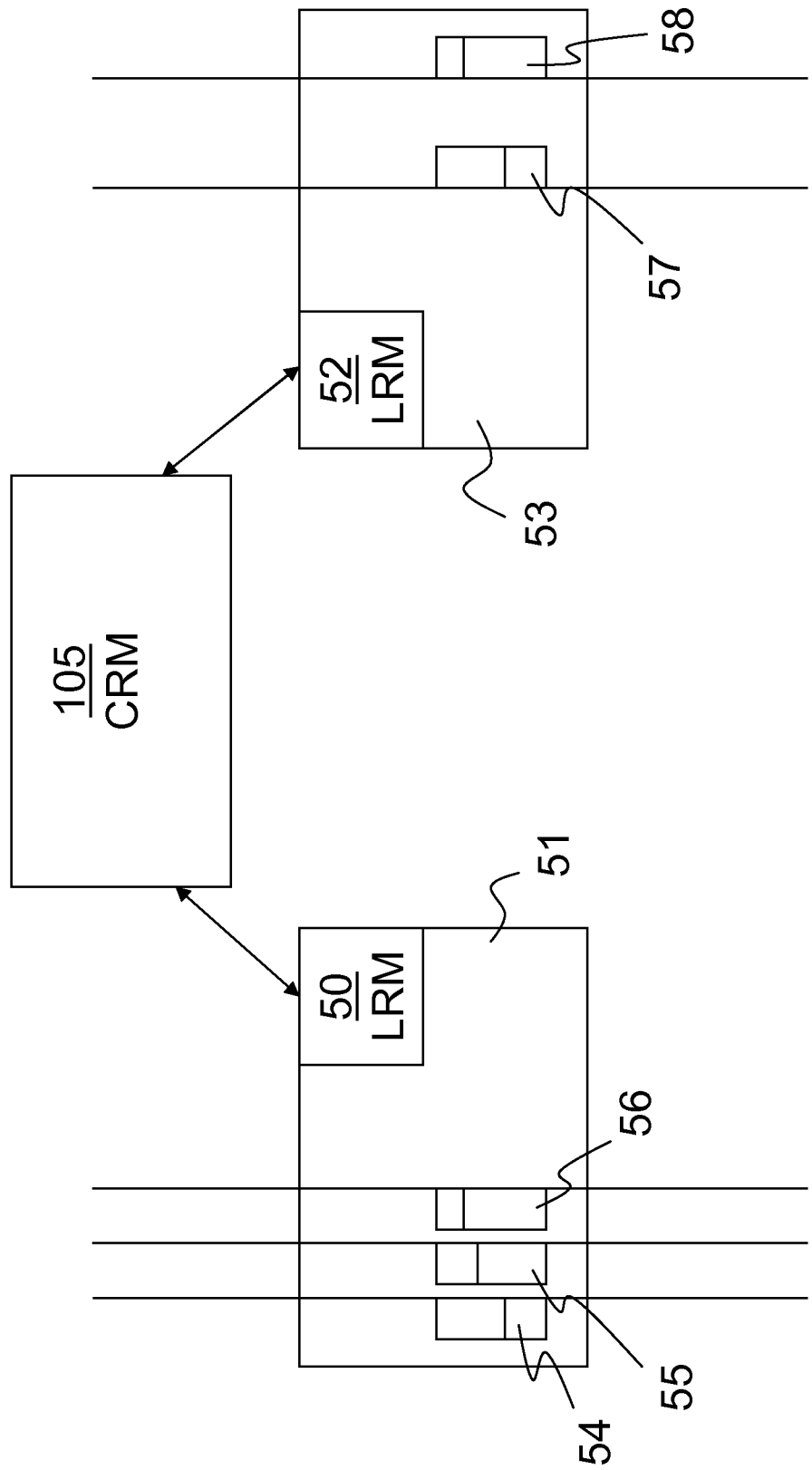
FIG. 5 is a schematic diagram of a radio communications system.

In FIG. 5, a schematic diagram of a resource management system is shown. The common resource management function 105 may be implemented in a multi-standard radio base station. The common resource management function 105 is arranged to be in communication with a first local resource manager 50 of a first radio access node 51 of a first network access technology. The common resource management function 105 is also arranged to be in communication with a second local resource manager 52 of a second radio access node 53 of a second network access technology. For example, may the first network access technology be represented by a WCDMA technology and the second network access technology may be represented by a LTE technology.

The first radio access node 51 handles a first amount of data 54 of a first bearer buffered in a first buffer, a second amount of data 55 of a second bearer buffered in a second buffer, and a third amount of data 56 of a third bearer buffered in a third buffer.

The second radio access node 53 handles a fourth amount of data 57 of a fourth bearer buffered in a fourth buffer, and a fifth amount of data 58 of a fifth bearer buffered in a fifth buffer.

The first local resource manager 50 reports resources needed per service bearer to the common resource manager function 105. Thus, the first local resource manager 50 transmits a report comprising indication of the first amount of data 54 and the service priority of the first bearer, the second amount of data 55 and the service priority of the second bearer, and the third amount of data 56 and the service priority of the third bearer.

The second local resource manager 52 reports resources needed per service bearer to the common resource manager function 105. Thus, the second local resource manager 52 transmits a report comprising indication of the fourth amount of data 57 and the service priority of the fourth bearer, and the fifth amount of data 58 and the service priority of the fifth bearer.

It should here be noted that the report may indicate resources needed per logical channel or a total sum of resources needed of a service priority such as a quality of service profile or service bearer priority.

The common resource manager function 105 may comprise a configurable table of ranking the different service priorities of the different network access technologies. Hence, after receiving the reports the common resource manager function 105 generates an allocation scheme based on the ranking in the table.

A basic approach would be to let the common resource management function 105 iterate around a number of basic steps, repeated according to a configured frequency upon which the resource allocation shall be re-evaluated. It is assumed that service priority such as a quality of service priority has been configured based on any input described above. The common resource manager function 105 may thereafter continuously iterate around steps 1-2 below:

1. Receives reports of input information on quality of service requirements and resource needs per logical channel:
   The resource need. The update frequency is configured as Fresource.
   The quality of service requirements per logical channel, which may be combined with the resource need to show the traffic distribution with respect to quality of service. The frequency for updating the quality of service information (Fqos) may be the same or larger than Fresource; Fqos Fresource. This depends on the ability of the processing node to handle such reports frequently.

2. Allocates resources per access with the frequency Fresource based on the quality of service based priority as explained in the previous section, starting with the highest prioritized bearer/profiles. The total resource per access becomes the sum of all resources allocated to bearers belonging to that specific access. This step may also include constraints on configured per-access priorities and requirements on minimum resources per carrier.

It is proposed to still let the local resource manager functionality decide the exact amount of resources to allocate to each logical channel in each time instant.

Available resources are allocated in order of the configured service priority until end of resources. Note that there may be several instances of multi-standard resource managers, one per resource type, or a combined multi-standard resource manager handling several resource types.

Figure 6:
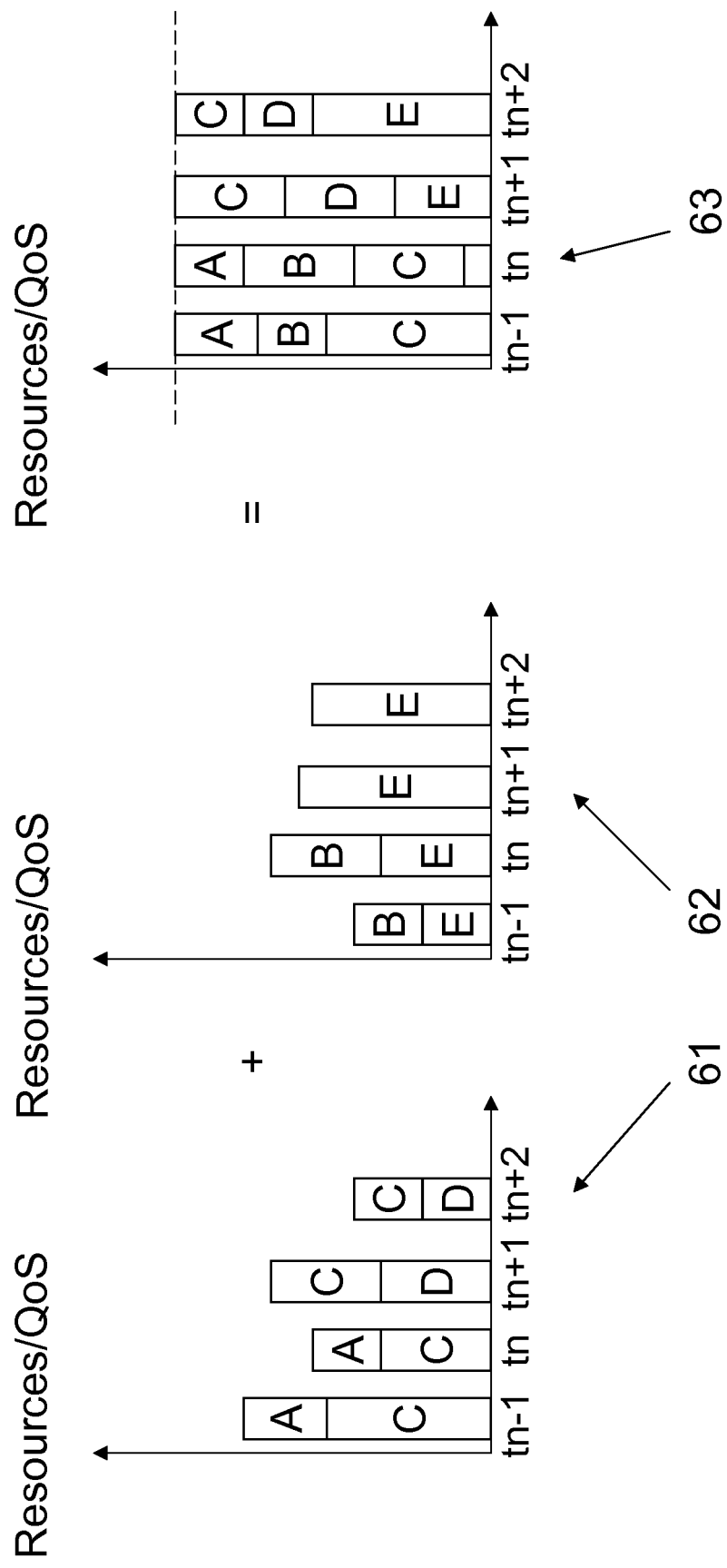
FIG. 6 is a schematic diagram of managing resources in a raido communications system.

FIG. 6 shows an example for how resources are being distributed considering the second step above. It illustrates an example on allocation of common resources to two different network accesses based on the quality of service requirements. A first resources needed per quality of service profile diagram of a first network access technology is disclosed in a first graph 61. A second resources needed per quality of service profile diagram of a second network access technology is disclosed in a second graph 62. Each graph defines resources needed per quality of service profile along the y-axis and time is defined along the x-axis.

The QoS ranking/priority of each flow determines on which flows the common resource is distributed. The different involved quality of service profiles of the two network accesses are being ranked according to a common priority, 'A' is the highest priority rank and 'E' is the lowest priority rank. As can be seen in this example, the left-most network access receives all needed resources due to the higher priority, while the other access does not get all needed resources due to the traffic of much lower priority. It can also be noted that the quality of service profiles may not be updated every time instant, meaning that the proportions of earlier reports are used until a new update takes place. In the illustrated example, the total of resources needed is measured every time step but the traffic types are only measured every second time step. This results in that the relation between the traffic types is set to be the same as the previous time step when the traffic types are not measured.

A third graph 63 discloses an allocation scheme of the CRM 105. The third graph defines resources available along the y-axis and time is defined along the x-axis. Along the y-axis a maximum amount of available resources is marked with a dashed line. The CRM 105 allocates the needed resources per quality of service profile based on the ranking of the quality of service profile. The available resources are "used" up with the highest ranking quality of service profile/s until no more resources are available.

Finally, as said earlier, it may be up to the local resource manager functionality to decide which traffic is actually given resources. Looking at the right-most access below, even though resources were given according to the reported need for traffic of priority=A and left-over resources for part of priority=C traffic at time tn−1, the traffic actually being transmitted may be from any of the logical channels.

Note that the approach for common resource management 105 may differ with different common resources. Naturally the same holds for the input as well as the output. Embodiments herein enable one to provide software features that truly dynamically distribute common resources among accesses in a multi-standard RAN scenario, creating software income and saving hardware for the operator. It is anticipated that operators will expect such functionality in multi-standard equipment. Since the functionality adds a common multi-standard overlay function on top of reused current per-access resource managers the implementation cost is limited.

The technique allocates resources to one/some of accesses highest priority since the actual service types are considered. Thus high priority services on the non-prioritized accesses may be allocated resources and low priority services on the access with the highest priority may have to wait for resources. Hence, the solution may consider the individual service requirements within each channel or carrier specifically. The common resource management functionality 105 will thus distinguish between the case when one carrier is loaded with low priority best effort data and when the same carrier is loaded with high priority packet-switched speech.

Figure 7:
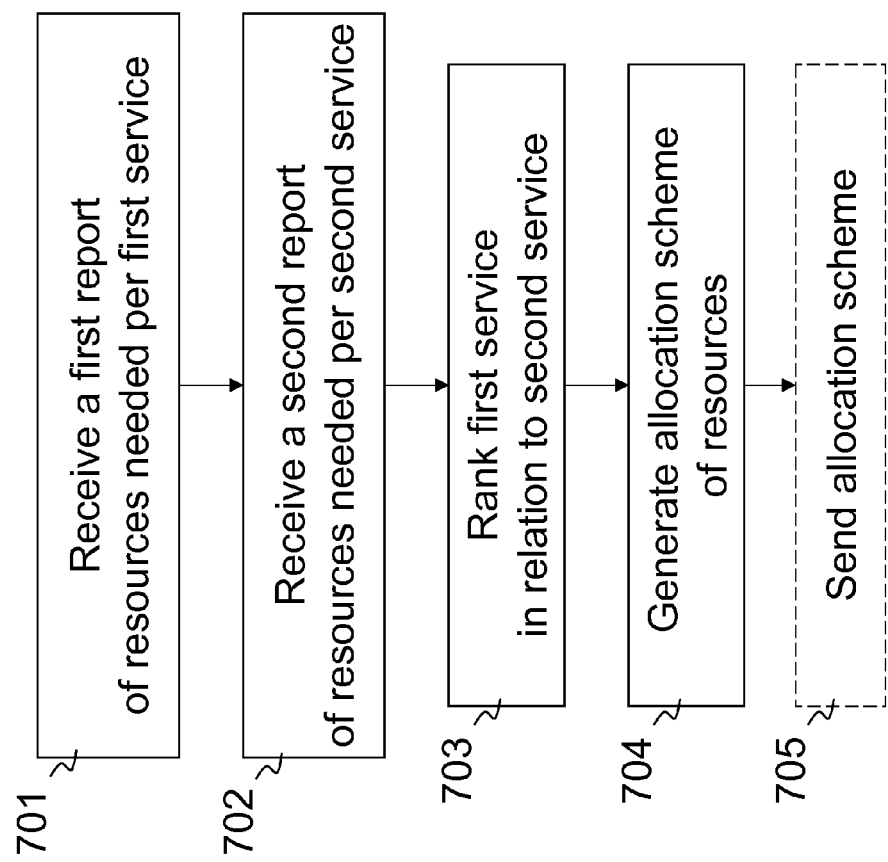
FIG. 7 is a schematic flow chart of a method in a communications node.

The method steps in the communication node for managing resources in a radio access network between different network access technologies according to some general embodiments will now be described with reference to a flowchart depicted in FIG. 7. The steps do not have to be taken in the order stated below, but may be taken in any suitable order.

Step 701. The communication node receives from a first local resource manager 111 of a first network access technology, a first report of information regarding resources needed per a first service. The first service is associated with a first local service priority of the first network access technology.

Step 702. The communication node receives from a second local resource manager 112 of a second network access technology, a second report of information regarding resources needed per a second service. The second service is associated with a second local service priority of the second network access technology.

The report of information may comprise a sum of all needed resources or resources per logical channel. The reports of information may be received every 10-1000 ms or the like.

In some embodiment, the communication node receives, from a third local resource manager of a third network access technology, a third report of information regarding resources needed per a third service, which third service is associated with a third local service priority of the third network access technology.

Step 703. The communication node ranks the first service in relation to the second service based on the first and second local service priority. The ranking may be based on scheduling priority indicators and related parameters in WCDMA compared with quality class indicator and related parameters in LTE and/or priority parameters in GSM. The ranking of the services may be performed according to a configurable stored table mapping each local service priority to a global service priority. The global prioritization may be according to standardization and/or operator configurable.

Step 704. The communication node 10 then generates an allocation scheme of resources, which allocation scheme allocates resources to at least one of the first or second local resource managers 111,112 based on the ranking of the service priorities.

In some embodiments, the generation of the allocation scheme takes into consideration the direction of the needed resource whether being downlink or uplink.

In some embodiments, wherein the communication node also has received a third report, the third report is also taken into account when ranking the service priorities and generating the allocation scheme of resources.

The generation of the allocation scheme may also define that available resources are allocated in order of the service priority until end of resources.

The communication access technology may be represented by a wireless access technology a so called radio access technology (RAT) and/or a wired access technology. In some embodiments, the transmission resources are shared between wired and wireless access technologies.

Step 705. This is an optional step as indicated by the dashed line. The communication node 10 sends the allocation scheme to the local resource manager/s of the first and/or the second network access technology. It should also be understood that the CRM 105 may use the allocation scheme to distribute the resources to the network access technologies.

A resource may be represented by transmit power of a common power amplifier, a hardware resource of a communication node, transport network capacity, and/or spectrum usage.

The communication node may be represented by a radio base station, radio base station controller, and/or a separate network node. In some embodiments, the communication node is represented by different nodes depending on type of resource.

In some embodiments, the local service priority is represented by quality of service profile or a service bearer priority.

Figure 8:
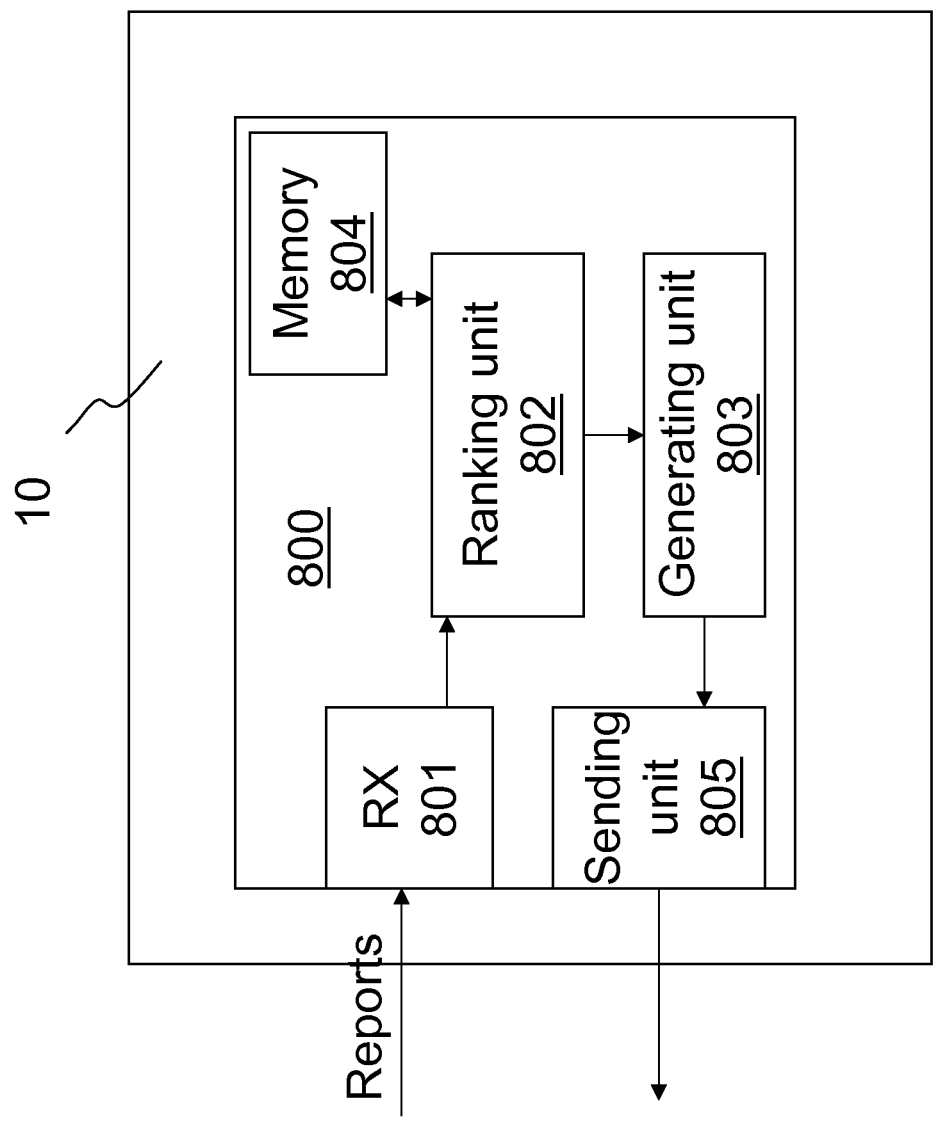
FIG. 8 is a schematic block diagram of an arrangement in the communications node.

In order to perform the method an arrangement 800 in the communication node for commonly managing resources in the radio access network between different network access technologies. FIG. 8 shows a schematic block diagram of the arrangement in the communication node.

The arrangement 800 comprises a receiving unit 801 arranged to receive from the first local resource manager of the first network access technology, the first report of information regarding resources needed per the first service. The first service is associated with a first local service priority of the first network access technology. The receiving unit 801 is further arranged to receive, from the second local resource manager of the second network access technology, the second report of information regarding resources needed per the second service. The second service is associated with a second local service priority of the second network access technology.

The arrangement 800 further comprises a ranking unit 802 arranged to rank the first local service priority in relation to the second local service priority. In addition, the arrangement 800 comprises a generating unit 803 arranged to generate an allocation scheme of resources, which allocation scheme allocates resources to at least one of the first or second local resource managers based on the ranking of the service priorities.

The arrangement 800 may comprise a memory 804 comprising a configurable table mapping each local service priority to a global service priority.

The receiving unit 801 may further be arranged to receive from the third local resource manager of the third network access technology, a third report of information regarding resources needed per the third service. The third service is associated with a third local service priority of the third network access technology. The ranking unit 802 and the generating unit 803 is further arranged to take the third report into account. The arrangement 800 may further comprise a sending unit 805 arranged to send the allocation scheme to the local resource manager/s of the first and/or the second network access technology.

The generating unit 803 may further take the direction of the needed resource whether being downlink or uplink into consideration when generating the allocation scheme.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a communication node for commonly managing radio access network resources between different network access technologies, which communication node is comprised in a radio access network of a radio communications network, the method comprising:
    receiving from a first local resource manager of a first network access technology, a first report of information indicating resources needed per a first service, which first service is associated with a first local service priority of the first network access technology, the first local resource manager managing the radio access network's use of at least one resource for the first network access technology;
    receiving from a second local resource manager of a second network access technology, a second report of information indicating resources needed per a second service, which second service is associated with a second local service priority of the second network access technology, the second local resource manager managing the radio access network's use of at least one resource for the second network access technology;
    ranking the first local service priority in relation to the second local service priority; and
    generating an allocation scheme of resources, which allocation scheme allocates resources to at least one of the first or second local resource managers based on the ranking of the service priorities.

2. The method of claim 1, further comprising
    sending the allocation scheme to the local resource manager/s of the first and/or the second network access technology.

3. The method of claim 1, wherein the step of generating allocation scheme takes into consideration the direction of the needed resource whether being downlink or uplink.

4. The method of claim 1, wherein a resource is represented by transmit power of a common power amplifier, a hardware resource of a communication node, transport network capacity, and/or spectrum usage.

5. The method of claim 1, wherein the ranking comprises ranking the services according to a configurable stored table mapping each local service priority to a global service priority.

6. The method of claim 1, wherein at least one of the first and second reports of information comprises a sum of all needed resources or a sum of needed resources per logical channel.

7. The method of claim 1, further comprising
    receiving from a third local resource manager of a third network access technology, a third report of information regarding resources needed per a third service, which third service is associated with a third local service priority of the third network access technology, and also taking the third report into account when ranking the service priorities and generating the allocation scheme of resources.

8. The method of claim 1, wherein the communication node is represented by a radio base station.

9. The method of claim 1, wherein the communication node is represented by a radio base station controller.

10. The method of claim 1, wherein the communication node is represented by a separate network node.

11. The method of claim 1, wherein the communication node is represented by different nodes depending on type of resource.

12. The method of claim 1, wherein each local service priority is represented by quality of service profile or a service bearer priority.

13. The method of claim 1, wherein the generated allocation scheme defines that available resources are allocated in order of the service priority until end of resources.

14. An arrangement in a communication node for commonly managing radio access network resources between different network access technologies, which communication node is comprised in a radio access network of a radio communications network that includes a first local resource manager that manages the radio access network's use of at least one resource for a first network access technology and a second local resource manager that manages the radio access network's use of at least one resource for a second network access technology, the arrangement comprising:
    a receiving unit arranged to receive, from the first local resource manager of the first network access technology, a first report of information indicating resources needed per a first service, which first service is associated with a first local service priority of the first network access technology, and to receive, from the second local resource manager of the second network access technology, a second report of information indicating resources needed per a second service, which second service is associated with a second local service priority of the second network access technology;
    a ranking unit arranged to rank the first local service priority in relation to the second local service priority; and
    a generating unit arranged to generate an allocation scheme of resources, which allocation scheme allocates resources to at least one of the first or second local resource managers based on the ranking of the service priorities.

* * * * *

UNITED STATES PATENT AND TRADEMARK OFFICE
CERTIFICATE OF CORRECTION

PATENT NO. : 8,996,019 B2
APPLICATION NO. : 13/501347
DATED : March 31, 2015
INVENTOR(S) : Eriksson et al.

It is certified that error appears in the above-identified patent and that said Letters Patent is hereby corrected as shown below:

IN THE SPECIFICATION

In Column 3, Line 24, delete "raido" and insert -- radio --, therefor.

In Column 6, Line 17, delete "central" and insert -- common --, therefor.

In Column 8, Line 18, delete "Fqos" and insert -- $Fqos \leq$ --, therefor.

Signed and Sealed this
Twenty-third Day of February, 2016

Michelle K. Lee
*Director of the United States Patent and Trademark Office*